United States Patent [19]

Redmann, Jr. et al.

[11] 4,408,808

[45] Oct. 11, 1983

[54] RELUBRICATABLE DOUBLE ROW BEARING

[75] Inventors: Jerry L. Redmann, Jr., Sparta; Gerald W. Gurney, Ada, both of Mich.

[73] Assignee: C. L. Frost & Son, Inc., Grand Rapids, Mich.

[21] Appl. No.: 288,317

[22] Filed: Jul. 30, 1981

[51] Int. Cl.³ .................. F16C 33/66; F16C 19/08
[52] U.S. Cl. .................. 308/187; 308/189 R
[58] Field of Search .............. 308/187, 189 R, 101, 308/207 R, 103, 188, 190, 208, 196, DIG. 5

[56] References Cited

U.S. PATENT DOCUMENTS

| | | | |
|---|---|---|---|
| 1,120,344 | 8/1914 | Templin | 384/371 |
| 1,703,380 | 2/1929 | Beemer | 308/187.1 |
| 1,776,272 | 9/1930 | Sanders | 308/187 |
| 1,927,534 | 9/1933 | Wooler | 308/214 |
| 2,272,757 | 2/1942 | Teker | 308/187 |
| 2,282,589 | 5/1942 | Mayne | 295/11 |
| 2,728,240 | 12/1955 | Stahlecker | 74/230.01 |
| 2,885,247 | 5/1959 | Schlums | 308/187 |
| 2,938,612 | 5/1960 | Schindel | 308/187 X |
| 3,110,528 | 11/1963 | Parker | 308/122 |
| 3,762,784 | 10/1973 | Pachuta | 308/207 |
| 4,039,233 | 8/1977 | Schmidt | 308/195 |

FOREIGN PATENT DOCUMENTS

| | | |
|---|---|---|
| 2229885 | 12/1974 | France. |
| 2450975 | 10/1980 | France. |
| 52-27965 | 3/1977 | Japan. |
| 719053 | 11/1954 | United Kingdom. |

OTHER PUBLICATIONS

C. L. Frost & Son Drawing No. 0405800 Titled "Roller Turn Roll", Dated 1965.
C. L. Frost & Son Drawing No. 0407700 Titled "Roller Turn Roll", Dated 1965.
C. L. Frost & Son Drawing No. 0307700 Titled "Roller Turn Roll", Dated 1965.
C. L. Frost & Son Drawing No. 0405100 Titled "Roller Turn Roll", Dated 1965.
C. L. Frost & Son Drawing No. 0405500 Titled "Roller Turn Roll", Dated 1965.

Primary Examiner—John Petrakes
Assistant Examiner—David Werner
Attorney, Agent, or Firm—Price, Heneveld, Huizenga & Cooper

[57] ABSTRACT

A relubricatable, double-row, rolling contact bearing having an outer race member, first and second inner race members positioned within the outer race member, first and second rows of balls positioned between the outer race member and the first and second inner race members, respectively, and a spacer positioned between the inner race members. Preferably, the spacer is a cylindrical body having an inner wall defining a lubricant reservoir and first and second faces defining grooves communicating with both the reservoir and the rows of balls or rollers. The faces further define recesses for receiving and aligning the inner race members with the spacer.

32 Claims, 7 Drawing Figures

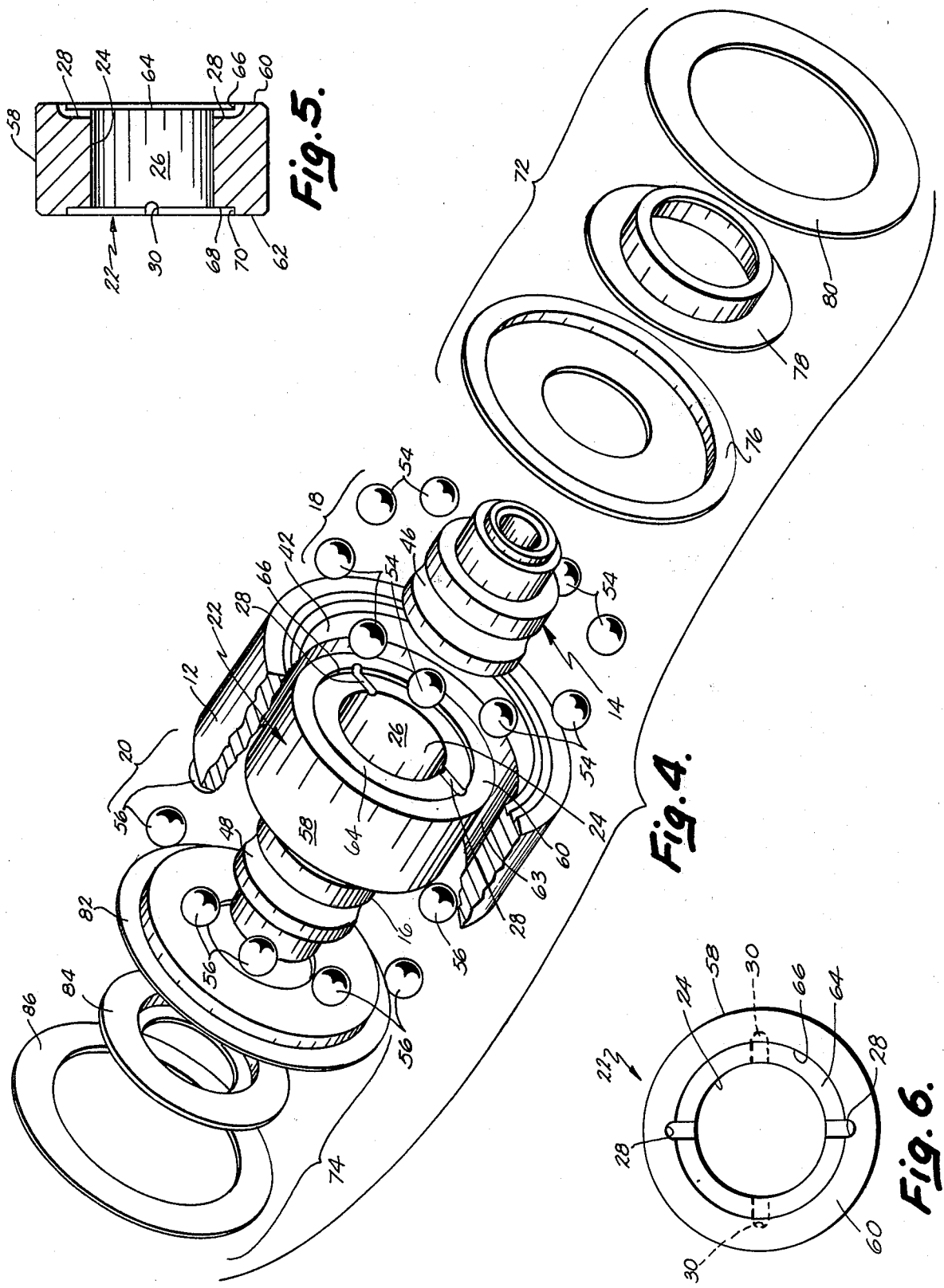

RELUBRICATABLE DOUBLE ROW BEARING

BACKGROUND OF THE INVENTION

This invention relates to rolling contact bearings, and more particularly to relubricatable, double-row bearings, especially those designed for use as roller turn rollers in conveyor applications.

Rolling contact bearings have long been used in a variety of applications. One type of rolling contact bearing is the double row bearing which includes an outer race member, two inner race members, and two rows of balls, or rollers, positioned between the outer race member and the inner race members.

To insure long life and smooth operation, such double-row bearings, and more particularly the balls or individual rollers in each row, must be lubricated so that the bearing will not dry out and fail due to lubrication starvation. Rolling contact bearing lubrication is facilitated primarily through two separate means. The first means is to position sealing means between the outer and inner race members at either end of the rolling contact bearing to retain lubricant in the bearing. The second means is to periodically relubricate the bearing through a passageway between the inner race members.

Usually, the two inner race members of a roller turn roller of the double-row variety described above are spaced one from the other to define a lubricant reservoir in conjunction with the outer race. This reservoir communicates with both rows of balls so that lubricant in the reservoir can travel to the rows to relubricate the balls. When the bearing is mounted for use using a hollow bolt passing through both inner race members, grease, or other suitable lubricant, can be introduced into the reservoir through the hollow bolt. Preferably, both a lubrication passageway and some type of seal are included in a roller turn roller to insure adequate lubrication.

When double-row rolling contact bearings are mounted along a generally vertical axis, lubrication difficulties become more acute. Any lubricant on the upper row tends to migrate downwardly due to the influence of gravity. Consequently, the upper row can fail much more quickly than the lower row due to lubricant starvation, while the lubricant in the reservoir tends to settle around and cause excessive lubrication of the lower row of balls.

Prior artisans have developed a variety of devices in an attempt to arrest excessive lubricant flow to the lower row while insuring adequate flow to the upper row. One such approach is to include a cylindrical spacing sleeve having at least one aperture therein between the inner race members, forming a reservoir defined by the sleeve, the outer race member, and the inner race members. Lubricant is introduced into the reservoir through a hollow bolt and the aperture in the sleeve to pressurize the reservoir. The grease in the reservoir under pressure tends to flow both upwardly and downwardly to lubricate both rows of balls. However, the pressurized grease also tends to settle around, and be lost past, the lower row of balls. Additionally, the reservoir is relatively large, requiring a large charge of lubricant during relubrication.

Prior artisans have also used washers on either side of the spacer sleeve adjacent both inner race members in double-row bearings. The washers have an outer diameter only slightly smaller than the inner diameter of the outer race member so that a restricted opening is defined between the grease reservoir and both rows of balls. Because of the restricted opening, the pressurized grease in the reservoir was arrested in its flow downwardly to the lower row of balls and out of the bearing. This approach also has its drawbacks. First, a relatively large grease reservoir exists in the bearing, requiring a large charge of grease to fill the bearing. Second, the construction requires several parts, further requiring relatively complex assembly.

Another approach taken is to replace the flat washers described above with dished washers. This approach also suffers the drawbacks of requiring several parts, complicated assembly, and a relatively large grease reservoir, requiring excessive amounts of grease to lubricate the bearing. Further, neither the flat nor dished washers totally prevent downward lubricant migration.

Although steps have been taken to reduce the volume of the lubricant reservoir, these have not been satisfactory. One bearing includes an outer race member having an inner wall extending into the reservoir to reduce the volume thereof. A second approach enlarged the cylindrical spacing sleeve to restrict the reservoir. However, these bearings are not typically relubricatable. Further, such bearings do not include means between the reservoir and the rows of balls for controlling the flow of grease therebetween.

SUMMARY OF THE INVENTION

The aforementioned problems are solved by the present invention. Essentially, a rolling contact bearing is provided having an outer race member, first and second inner race members positioned within the outer race member, first and second rows of balls or rollers positioned between the outer race member and the first and second inner races members, respectively, and a spacer positioned between and abutting both the first and second inner race members. The spacer has an outer diameter somewhat smaller than the inner diameter of the outer race member. The inner wall of the spacer defines a relatively small lubricant reservoir. Passages are defined by the spacer communicating with both the lubricant reservoir and both the first and second rows of balls.

The relubricatable rolling contact bearing of the present invention has a relatively small reservoir. Consequently, a relatively small charge of lubricant is required to fully relubricate the bearing. Elimination of a large, stored charge of lubricant within the bearing also eliminates degradation and/or spoilage of substantial amounts of inactive lubricant during use of the bearing in hostile environments, such as those including high temperatures, high ambient contaminant levels and the like. Second, because the outer diameter of the spacer is only very slightly smaller than the inner diameter of the outer race member, these two pieces cooperate to arrest undesired lubricant flow. Third, the passages in the spacer member communicating with the reservoir and the rows of balls provide proper lubricant flow under pressure equally to both rows of balls in the bearing. Fourth, direction controlled grease flow insures best lubricant placement. An additional unexpected benefit of this invention is the ease and accuracy in providing proper race alignment, as set forth below. This is provided by the spacer with recesses receiving the inner race members during assembly.

In a preferred embodiment of the invention, the passages are grooves defined in the faces of the spacer abutting the first and second inner race members. Also, in a preferred embodiment of the invention, the faces of the spacer abutting the inner race members further define recesses dimensioned to receive the race members to axially and radially align all of the bearing elements, resulting in the unexpected benefit mentioned above. This preferred embodiment of the spacer is manufactured from a sintered metal so that both the grooves and the recesses are formed during the molding operation. Consequently, the spacer can be precisely dimensioned without any secondary machining, which further reduces the cost of the assembly. Preferably, seals are provided to further retain lubricant within the bearing.

These and other objects, advantages, and features of the invention will be more fully understood and appreciated by reference to the written specification and appended drawings.

BRIEF DESCRIPTION OF THE DRAWINGS

FIG. 4 is a perspective exploded view of the rolling contact bearing of FIGS. 1-3 excluding the axle member;

FIG. 5 is a sectional side view of the spacer;

FIG. 6 is a plan view of the spacer of FIG. 5; and

DESCRIPTION OF THE PREFERRED EMBODIMENT

Figure 1:
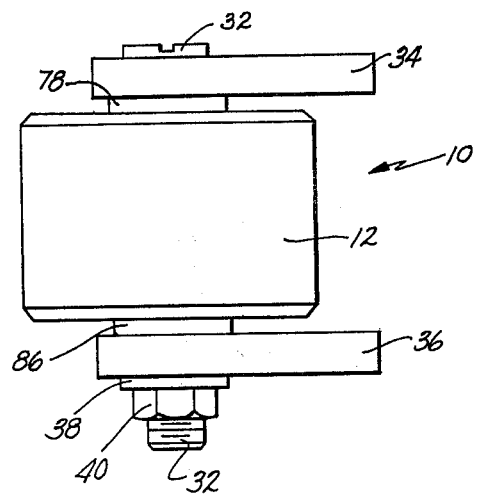
FIG. 1 is an elevational view of the rolling contact bearing of the present invention installed in a typical overhead conveyor as a horizontal roller turn roller.

A double-row rolling contact bearing in accordance with a preferred embodiment of the invention is illustrated in the drawings and generally designated 10. As seen in FIGS. 1, 2, 3, and 4, bearing 10 includes an outer race member 12, two inner race members 14 and 16 positioned within outer race member 12, two rows of balls 18 and 20 positioned between outer race member 12 and inner race members 14 and 16, respectively, and spacer 22 positioned between inner race members 14 and 16. Spacer 22 is a generally cylindrical member having an inner wall 24 defining a lubricant reservoir 26 between wall 24, the inner end faces of inner race members 14, 16 and a surface 27 of supporting bolt 32 and grooves 28 and 30 which communicate at one end with grease reservoir 26 and at their opposite ends with balls 54 and 56, respectively (FIGS. 5 and 6). A hollow bolt, or axle member, 32 including passage 88 is received through the central bores of inner race members 14, 16 to support the assembly. When bearing 10 is mounted using hollow bolt 32, bearing 10 may be relubricated by introducing lubricant into reservoir 26 through hollow bolt 32. This lubricant then travels under pressure through grooves 28 and 30 to lubricate balls 54 and 56.

Bearing 10 is a double-row roller turn roller which is used to hold conveyor chains under the vertical centerline of an I-beam on horizontal curves, and guide conveyor chains around such horizontal curves or turns, in overhead conveyors. Roller turn rollers are well-known to those having ordinary skill in the art, and consequently, a more detailed explanation of such rollers in general is unnecessary. Suffice it to say that bearing 10 is mounted with its central axis oriented generally vertically, as shown in FIG. 1. Bearing 10 is supported on horizontal arms 34 and 36 and secured thereto by bolt 32, which is secured using washer 38 and nut 40. When so mounted, bearing 10, and more particularly outer race member 12, is free to rotate in a generally horizontal plane.

Outer race member 12 is a generally cylindrical member having an inner wall defining arcuate outer races 42 and 44 and inner wall 63 therebetween. Inner race members 14 and 16 are also generally cylindrical members defining arcuate inner races 46 and 48, respectively. Outer race 42 and inner race 46 together define an area designated raceway 50; likewise, outer race 44 and inner race 48 together define raceway 52. Balls 54, comprising a row of balls 18, are positioned within raceway 50 engaging both outer race 42 and inner race 46. Likewise, balls 56, comprising ball row 20, are positioned within raceway 52 engaging both outer race 44 and inner race 48.

Spacer 22 is positioned between and abuts both inner race members 14 and 16. The generally cylindrical body of spacer 22 has concentric outer and inner walls 58 and 24, and two generally planar end faces 60 and 62 generally perpendicular to the walls. The outer diameter of spacer wall 58 is only slightly smaller than the inner diameter of outer race wall 63. Accordingly, undesired lubricant flow between these two members is greatly restricted. Recess 64 (FIGS. 5 and 6) is defined by face 60, also defining recess lip 66 and is generally circular being concentric with both inner and outer walls 24 and 58. Likewise, recess 68 is defined by face 62, also defining recess lip 70. Recess 68 is also generally circular, being concentric with both inner and outer walls 24 and 58. Both of recesses 64 and 68 are dimensioned to closely receive inner race members 14 and 16, respectively. Consequently, spacer 22 and race members 14 and 16 may be readily and easily aligned during assembly by positioning race member 14 within recess 64 and race member 16 within recess 68.

As is best seen in FIGS. 5 and 6, faces 60 and 62 further define L-shaped lubricant passageways or grooves 28 and 30, respectively. Grooves 28 communicate at one end with reservoir 26 and at their opposite ends with raceway 50 and ball row 18 positioned therein. As most clearly seen in FIGS. 4 and 6, grooves 28 extend radially along recess 64, then bend, and extend axially along recess lip 66. Similarly, grooves 30 extend through recess 68 and recess lip 70 to communicate with reservoir 26 and raceway 52 and ball row 20 positioned therein. When lubricant is placed in reservoir 26 under pressure, it travels, or migrates, through grooves 28 and 30 to lubricate ball rows 18 and 20 positioned within raceways 50 and 52, respectively.

Optionally, grooves 30 can be omitted from spacer 22 so that lubricant can flow out of reservoir 26 only through grooves 28. In such an embodiment, upper balls 54 are lubricated by lubricant from reservoir 26 passing through grooves 28, and lower balls 56 are lubricated by lubricant from upper raceway 50 passing between outer race member 12 and spacer 22. Another option, would allow for a seal to function between spacer 22 and outer race inner surface 63 to prevent lubricant flow from upper raceway 50.

Spacer 22 of the preferred embodiment defines two grooves 28 and two grooves 30. Further, as seen in FIG. 6, each of grooves 28 is angularly offset 90° from each of grooves 30. Of course, any number of grooves having any angular offset could be included with relatively equal results.

Spacer 22 of the preferred embodiment is fabricated from a sintered metal. Consequently, the entire piece can be formed in one sintering operation. Therefore, no secondary machining is required to form either recesses 64 and 68 or grooves 28 and 30. The absence of secondary machining reduces the cost of spacer 22, and accordingly, the cost of the entire bearing 10. Alternatively, the spacer could also be zinc die cast or made from a molded, suitably rigid plastic.

Seals 72 and 74 are positioned at opposite ends of bearing 10 and extend between outer race member 12 and inner race members 14 and 16, respectively. Seals 72 and 74 are positioned proximate ball rows 18 and 20, respectively, opposite spacer 22. Seals 72 and 74 are of the triple labyrinth type and are known to those having ordinary skill in the art, and accordingly, a detailed description is not necessary. Suffice it to say that inner and outer seal members 76 and 80 are press fit into outer race member 12 for rotation therewith, and middle or intermediate seal member 78 is press fit into inner race member 14 to remain stationary therewith. Middle seal member 78 is sandwiched between inner and outer members 76 and 80 to form a barrier to the entrance of contaminant particles into the bearing and the exit of grease from the bearing. Similarly, seal 74 comprises inner and outer seal members 82 and 86 press fit into outer race member 12 and middle or intermediate seal member 84 press fit into inner race member 16 and sandwiched between members 82 and 86.

Figure 2:
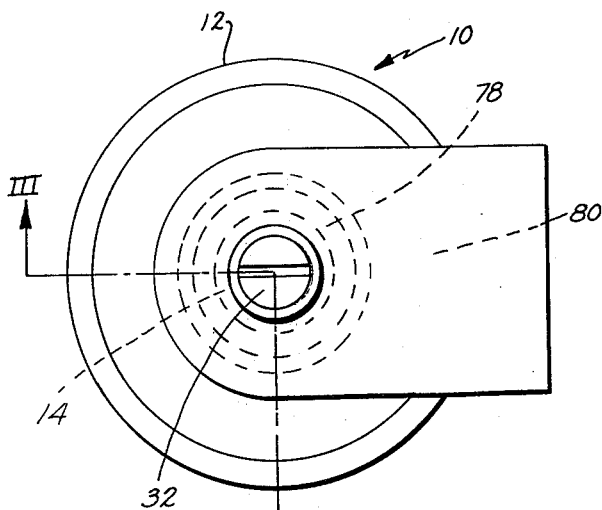
FIG. 2 is a top plan view of the rolling contact bearing of FIG. 1 with the support arms from the conveyor removed.

Bolt 32 which extends through bearing 10 includes passage 88 and grease fitting 90 (FIG. 2). Therefore, lubricant can be introduced into reservoir 26 by injecting grease through fitting 90 and passage 88 into the reservoir. The capacity of reservoir 26 is selected by varying the diameter of inner wall 24 and/or surface 27 on bolt 32.

OPERATION

Bearing 10 is mounted generally axially vertically between horizontal arms 34 and 36. A bolt 32 passes through arms 34 and 36, as well as bearing 10, to secure the bearing in position. Bolt 32 is secured using washer 38 and nut 40. When so mounted, the extending shoulders 15, 17 of inner race members 14 and 16, which may or may not include portions of seal members 78, 86, which abut arms 34 and 36, respectively, do not rotate, remaining in fixed angular relationship to the arms. Likewise, spacer 22, which is sandwiched between race members 14 and 16, does not rotate when bearing 10 is so mounted. However, race member 12 is free to rotate about race members 14 and 16 with balls 54 and 56 rotating therebetween.

Bearing 10 is easily and readily relubricated by injecting lubricant into reservoir 26 through hollow bolt 32. A grease gun (not shown) or other suitable lubricating device is connected to grease fitting 90, and lubricant is injected through passage 88 into reservoir 26. The lubricant injected into reservoir 26 then travels, or migrates, through grooves 28 and 30 into raceways 50 and 52, respectively, to lubricate ball rows 18 and 20. Seals 72 and 74 mounted proximate ball rows 18 and 20, respectively, aid in preventing the lubricant from leaving the bearing. Because inner wall portion 63 of outer race member 12 extends toward and is closely adjacent outer wall 58 of spacer 22, lubricant cannot readily pass between these members from upper ball row 18 to lower row 20.

ALTERNATIVE EMBODIMENT

Figure 7:
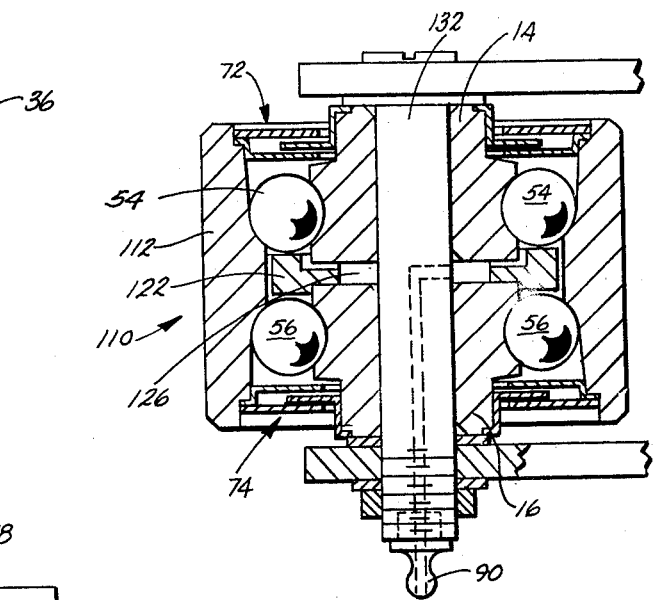
FIG. 7 is a sectional side view of an alternative embodiment of the rolling contact bearing of the present invention.
Figure 3:
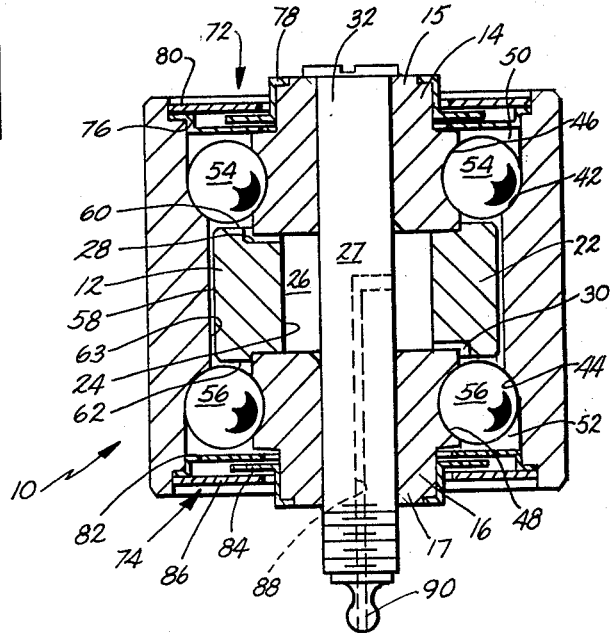
FIG. 3 is a sectional view of the rolling contact bearing of FIGS. 1 and 2 taken along plane III—III of FIG. 2.

An alternative embodiment 110 of the bearing is shown in FIG. 7. Basically, alternative bearing 110 is generally the same as bearing 10 and like numerals indicate like parts, except that its overall height is somewhat shorter. The height reduction is accomplished by assembling bearing 110 using outer race member 112, spacer 122, and bolt 132, which are all shorter by the same amount than their counterparts 12, 22 and 32, respectively, in bearing 10. The remaining elements of alternative bearing 110, namely, inner race members 14 and 16, upper and lower balls 54 and 56, and seals 72 and 74, are identical to those of bearing 10. Reservoir 126 is smaller than reservoir 26 because spacer 122 is shorter than spacer 22. The operation of alternative bearing 110 is identical to that of bearing 10.

It should be understood that the above description is intended to be that of preferred embodiments of the invention. Various changes and alterations might be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. In a relubricatable bearing having:
    an outer race member having an inner wall defining two outer races, said inner wall including a portion between said outer races;
    first and second inner race members defining first and second inner races, respectively, said first and second inner race members being located within said outer race member;
    a first row of balls positioned between and engaging both said outer race and said first inner race;
    a second row of balls positioned between and engaging both said outer race and said second inner race, the improvement comprising:
    a spacer positioned between and engaging both said first and second inner race members, said spacer comprising a body having an inner wall defining a lubricant reservoir, an outer wall adjacent said inner wall portion between said outer races of said outer race member, and first and second faces abutting said first and second inner race members, respectively, said first face defining at least one first groove extending along said first face from said reservoir to said first row of balls, said second face defining at least one second groove extending along said second face from said reservoir to said second row of balls, whereby lubricant under pressure in said reservoir will migrate through said first and second grooves between said spacer and said inner race members to lubricate said first and second rows of balls, respectively.

2. The relubricatable bearing as defined in claim 1 wherein said first face defines two of said first grooves and said second face defines two of said second grooves.

3. The relubricatable bearing as defined in claim 1 wherein said spacer is formed from a sintered metal.

4. The relubricatable bearing as defined in claim 1 further comprising:
   a first sealing means extending between said outer race member and said first inner race member proximate said first row of balls opposite said spacer for aiding in retaining lubricant on said first row of balls; and
   a second sealing means extending between said outer race member and said second inner race member proximate said second row of balls opposite said spacer for aid in retaining lubricant on said second row of balls.

5. The relubricatable bearing as defined in claim 1 wherein said inner wall portion of said outer race member extends toward said spacer.

6. The relubricatable bearing as defined in claim 1 further comprising an axle member extending through said first and second inner race members and said spacer and wherein said reservoir is further defined by a portion of said axle member.

7. The relubricatable bearing as defined in claim 1 wherein said first and second grooves are L-shaped.

8. In a relubricatable bearing having:
   first and second inner race members defining first and second inner races, respectively;
   a spacer positioned between and abutting both said first and second inner race members;
   an outer race member defining first and second outer races, said first inner and outer races defining a first raceway, said second inner and outer races defining a second raceway; and
   first and second rows of balls positioned within said first and second raceways, respectively, the improvement comprising:
      said spacer comprising a generally cylindrical body having an outer wall immediately proximate said outer race, an inner wall defining a lubricant reservoir, first and second generally planar faces abutting said first and second inner race members, respectively, said first face defining at least one first recessed lubricant passage extending along said first face from said reservoir to said first race, and said second face defining at least one second recessed lubricant passage extending along said second face from said reservoir to said second race.

9. The relubricatable bearing as defined in claim 8 wherein said first face defines two of said first passages and said second face defines two of said second passages.

10. A relubricatable bearing as defined in claim 8 wherein said spacer is formed from a sintered metal.

11. A relubricatable bearing as defined in claim 8 further comprising first and second sealing means proximate said first and second rows of balls, respectively, opposite said spacer for sealing said inner race against said outer race to reduce lubricant leakage.

12. A spacer for a relubricatable, double-row, rolling contact bearing comprising a generally cylindrical body having concentric inner and outer walls, and first and second generally planar faces generally perpendicular to said inner and outer walls, said first and second faces defining first and second generally cylindrical recesses, respectively, each of said recesses defining a lip and being concentric with said inner and outer walls, each of said first and second faces further defining at least one groove extending from said inner wall generally radially along said recess and generally axially along said lip of said recess.

13. A spacer as defined in claim 12 wherein said spacer is formed from a sintered metal.

14. A spacer as defined in claim 12 wherein each of said first and second faces defines two of said grooves.

15. In a relubricatable bearing having:
   first and second inner race members defining first and second inner races, respectively;
   a spacer positioned between and abutting both said first and second inner race members;
   an axle member extending through said first and second inner race members and said spacer;
   an outer race member defining first and second outer races, said first inner and outer races defining a first raceway, said second inner and outer races defining a second raceway; and
   first and second rows of balls positioned within said first and second raceways, respectively, the improvement comprising:
      said spacer comprising a generally cylindrical body having an outer wall closely proximate said outer race, an inner wall, first and second generally planar faces abutting said first and second inner race members, respectively; said axle member, said inner spacer wall, and said first and second inner race members together defining a lubricant reservoir; and said first face defining at least one first recessed lubricant passage extending therealong and communicating with both said reservoir and said first race.

16. In a relubricatable bearing having:
   first and second inner race members defining first and second inner races, respectively;
   a spacer positioned between and abutting both said first and second inner race members;
   an outer race member defining first and second outer races, said first inner and outer races defining a first raceway, said second inner and outer races defining a second raceway; and
   first and second rows of balls positioned within said first and second raceways, respectively, the improvement comprising:
      said spacer comprising a generally cylindrical body having an outer wall closely proximate said outer race, an inner wall defining a lubricant reservoir, first and second generally planar faces abutting said first and second inner race members, respectively, said first face defining at least one first lubricant groove extending therealong and communicating with both said reservoir and said first race.

17. In a relubricatable bearing having:
   an outer race member having an inner wall defining two outer races;
   first and second inner race members defining first and second inner races, respectively, said first and second inner race memers being located within said outer race member;
   a first row of balls positioned between and engaging both said outer race and said first inner race;
   a second row of balls positioned between and engaging both said outer race and said second inner race, the improvement comprising:
      a spacer positioned between and engaging both said first and second inner race members, said spacer comprising a body having an inner wall defining a lubricant reservoir, an outer wall proximate a portion of said inner wall between said outer races of said outer race member, and first and second faces abutting said first and second inner race members, respectively, said first face defining a first recess dimensioned to receive said first inner race member to axially and radially align said first inner race member and said spacer, said second face defining a second recess dimensioned to receive said second inner race member to axially and radially align said second inner race member and said spacer, said first face defining at least one first groove communicating with both said reservoir and said first row of balls, said second face defining at least one second groove communicating with both said reservoir and said second row of balls, whereby lubricant under pressure in said reservoir will migrate through said first and second grooves to lubricate said first and second rows of balls, respectively.

18. The relubricatable bearing as defined in claim 17 wherein said first face defines two of said first grooves and said second face defines two of said second grooves.

19. The relubricatable bearing as defined in claim 17 wherein said spacer is formed from a sintered metal.

20. The relubricatable bearing as defined in claim 17 further comprising:
a first sealing means extending between said outer race member and said first inner race member proximate said first row of balls opposite said spacer for aiding in retaining lubricant on said first row of balls; and
a second sealing means extending between said outer race member and said second inner race member proximate said second row of balls opposite said spacer for aid in retaining lubricant on said second row of balls.

21. The relubricatable bearing as defined in claim 17 wherein a portion of said inner wall of said outer race member extends toward said spacer.

22. The relubricatable bearing as defined in claim 17 further comprising an axle member extending through said first and second inner race members and said spacer and wherein said reservoir is further defined by a portion of said axle member.

23. The relubricatable bearing as defined in claim 22 wherein said axle member has a lubricant passage communicating with said reservoir.

24. The relubricatable bearing as defined in claim 17 wherein said first and second grooves are L-shaped.

25. In a relubricatable bearing having:
an outer race member having an inner wall defining two outer races; first and second inner race members defining first and second inner races, respectively, said first and second inner race members being located within said outer race member;
a first row of balls positioned between and engaging both said outer race and said first inner race;
a second row of balls positioned between and engaging both said outer race and said second inner race, the improvement comprising:
a spacer positioned between and engaging both said first and second inner race members, said spacer comprising a body having an inner wall defining a lubricant reservoir, an outer wall proximate a portion of said inner wall between said outer races of said outer race member, and first and second faces abutting said first and second inner race members, respectively, said first face defining a first recess dimensioned to receive said first inner race member to axially and radially align said first inner race member and said spacer, said second face defining a second recess dimensioned to receive said second inner race member to axially and radially align said second inner race member and said spacer, said spacer defining at least one first passage communicating with both said reservoir and said first row of balls, said spacer further defining at least one second passage communicating with both said reservoir and said second row of balls, whereby lubricant under pressure in said reservoir will migrate through said first and second passages to lubricate said first and second rows of balls, respectively.

26. In a relubricatable bearing having:
first and second inner race members defining first and second inner races, respectively;
a spacer positioned between and abutting both said first and second inner race members;
an outer race member defining first and second outer races, said first inner and outer races defining a first raceway, said second inner and outer races defining a second raceway; and
first and second rows of balls positioned within said first and second raceways, respectively, the improvement comprising:
said spacer comprising a generally cylindrical body having an outer wall fitting closely within said outer race, an inner wall defining a lubricant reservoir, first and second generally planar faces abutting said first and second inner race members, respectively, said first face defining a recess dimensioned to receive said first inner race member to axially and radially align said spacer and said first inner race member, said second face defining a recess dimensioned to receive said second inner race member to axially and radially align said spacer and said second inner race member, said first face defining at least one first lubricant passage communicating with said reservoir and said first race, and said second face defining at least one second lubricant passage communicating with said reservoir and said second face.

27. The relubricatable bearing as defined in claim 26 wherein said first face defines two of said first passages and said second face defines two of said second passages.

28. A relubricatable bearing as defined in claim 26 wherein said spacer is formed from a sintered metal.

29. A relubricatable bearing as defined in claim 26 further comprising first and second sealing means proximate said first and second rows of balls, respectively, opposite said spacer for sealing said inner race against said outer race to reduce lubricant leakage.

30. In a relubricatable bearing having:
an outer race member having an inner wall defining two outer races;
first and second inner race members defining first and second inner races, respectively, said first and second inner race members being located within said outer race member;
a first row of balls positioned between and engaging both said outer race and said first inner race;
a second row of balls positioned between and engaging both said outer race and said second inner race;
a spacer positioned between and engaging both said first and second inner race members; and
an axle member extending through said first and second inner members and said spacer, said axle member having a lubricant passage terminating between said inner race members, the improvement comprising:

said spacer comprising a body having an inner wall defining together with said axle member a lubricant reservoir, an outer wall adjacent a portion of said inner wall between said outer races of said outer race member, and first and second faces abutting said first and second inner race members, respectively, said spacer defining at least one first groove extending along said first face and communicating with both said reservoir and said first row of balls, said spacer further defining at least one second groove extending along said second face and communicating with both said reservoir and said second row of balls, whereby lubricant under pressure in said reservoir will migrate through said first and second grooves to lubricate said first and second rows of balls, respectively.

31. In a relubricatable bearing having:

an outer race member having an inner wall defining two outer races;

first and second inner race members defining first and second inner races, respectively, said first and second inner race members being located within said outer race member;

a first row of balls positioned between and engaging both said outer race and said first inner race;

a second row of balls positioned between and engaging both said outer race and said second inner race;

a spacer positioned between and engaging both said first and second inner race members; and an axle member extending through said first and second inner race members and said spacer, said axle member having a lubricant passage terminating between said inner race members, the improvement comprising:

said spacer comprising a body having an inner wall defining together with said axle member a lubricant reservoir, an outer wall adjacent a portion of said inner wall between said outer races of said outer race member, and first and second faces abutting said first and second inner race members, respectively, said first face defining at least one first groove extending therealong and communicating with both said reservoir and said first row of balls, said second face defining at least one second groove extending therealong and communicating with both said reservoir and said second row of balls, whereby lubricant under pressure in said reservoir will migrate through said first and second grooves between said spacer and said inner race members to lubricate said first and second rows of balls, respectively.

32. In a relubricatable bearing having:

an outer race member having an inner wall defining two outer races;

first and second inner race members defining first and second inner races, respectively, said first and second inner race members being located within said outer race member;

a first row of balls positioned between and engaging both said outer race and said first inner race;

a second row of balls positioned between and engaging both said outer race and said second inner race, the improvement comprising:

a spacer positioned between and engaging both said first and second inner race members, said spacer comprising a body having an inner wall defining a lubricant reservoir, said body further having first and second faces abutting said first and second inner race members, respectively, said first face defining at least one first groove extending therealong and communicating with both said reservoir and said first row of balls, said second face defining at least one second groove extending therealong and communicating with both said reservoir and said second row of balls, whereby lubricant under pressure in said reservoir will migrate through said first and second grooves between said spacer and said inner race members to lubricate said first and second rows of balls, respectively.

* * * * *

UNITED STATES PATENT AND TRADEMARK OFFICE
CERTIFICATE OF CORRECTION

PATENT NO. : 4,408,808

DATED : October 11, 1983

INVENTOR(S) : Jerry L. Redmann, Jr. and Gerald W. Gurney

It is certified that error appears in the above-identified patent and that said Letters Patent is hereby corrected as shown below:

Column 8, line 55:
"memers" should be --members--;

Column 10, line 41:
"face" should be --race--;

Column 10, line 67:
after "inner" insert --race--.

Signed and Sealed this

Fourth Day of September 1984

[SEAL]

Attest:

GERALD J. MOSSINGHOFF

Attesting Officer     Commissioner of Patents and Trademarks